Dec. 28, 1926.  
G. J. WELTER  
PUMP OPERATING MECHANISM  
Original Filed May 13, 1925
1,612,481
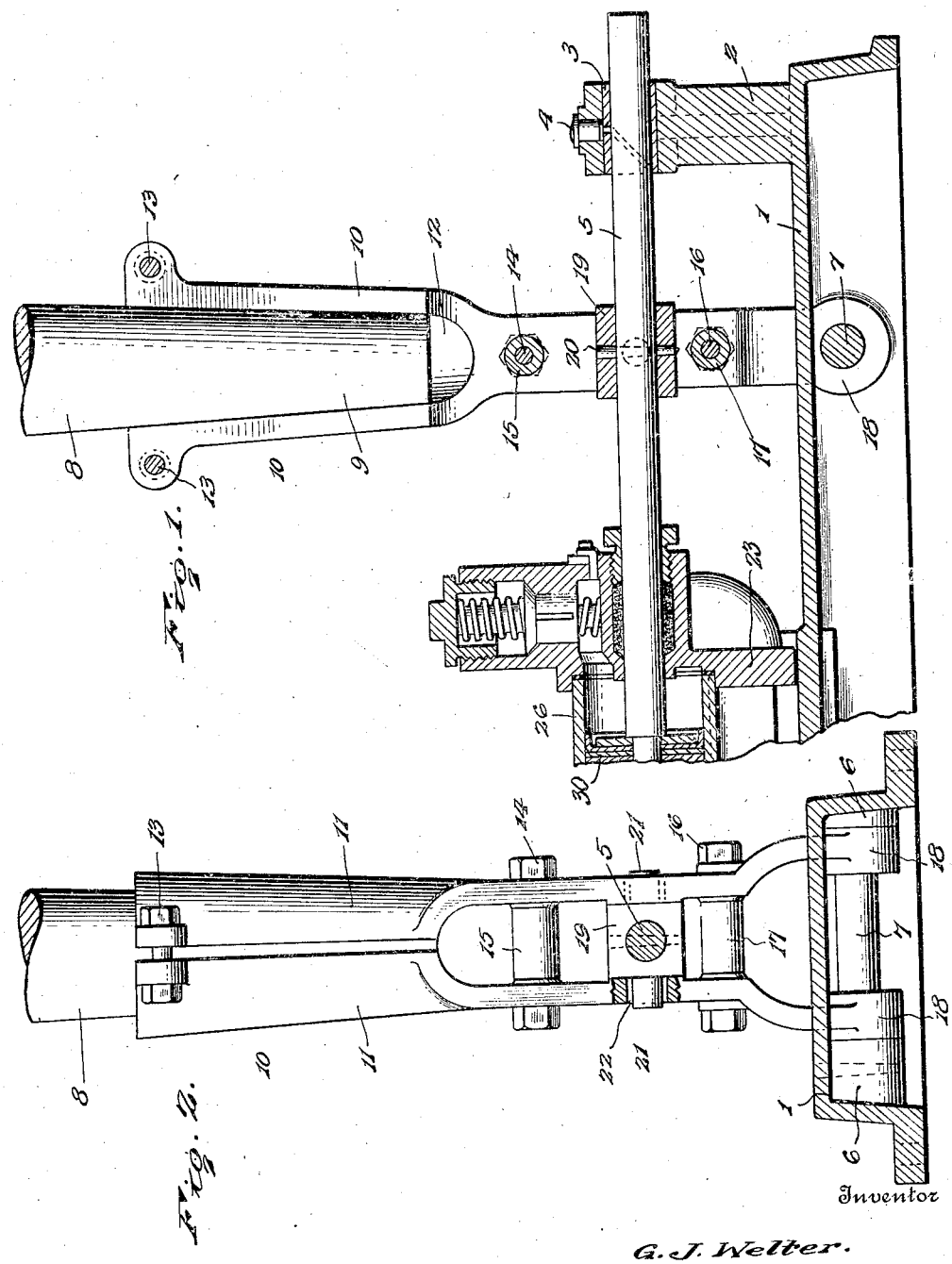
Inventor
G. J. Welter.
By Lacey & Lacey, Attorneys Patented Dec. 28, 1926.

1,612,481

UNITED STATES PATENT OFFICE.

GEORGE J. WELTER, OF TIFFIN, OHIO.

PUMP-OPERATING MECHANISM.

Original application filed May 13, 1925, Serial No. 30,011. Divided and this application filed February 26, 1926. Serial No. 90,856.

This application is a division of an application, Serial No. 30,011, filed by me May 13, 1925.

The object of the present invention is to provide a simple mechanism whereby a reciprocatory pump plunger may be easily and efficiently operated. The invention is illustrated in the accompanying drawing and will be hereinafter fully set forth.

In the drawing:

Figure 1 is a sectional elevation of a mechanism embodying the invention, and

Fig. 2 is an end elevation of the same with parts in section.

In the drawing, the reference numeral 1 indicates a bed plate which may be of any approved form and dimensions and is provided at one end with a post 2 having a bearing formed longitudinally through its upper end, the said bearing being lined by a bushing 3 to which lubricant may be supplied from an oil cup 4 and being adapted to receive and support and guide the outer end of the piston rod 5. Adjacent the post 2 an opening is provided through the bed plate 1 and on the under side of the bed plate adjacent the ends of the said opening are formed bosses 6 adapted to receive and retain a fulcrum pin 7 whereby the operating lever 8 may be supported for rocking movement. The lever 8 may conveniently be a wooden bar of any approved length but is not mounted directly upon the fulcrum pin 7. To properly mount the lever upon the said fulcrum pin, the lower tapered end 9 thereof is fitted within a socket 10 which, as shown most clearly in Figs. 1 and 2, consists of mating members 11 having their bores or channels 12 downwardly tapered so that the lower tapered end of the lever may fit snugly therein. To secure the socket members in snugly clamping relation to the lever, clamping bolts 13 are fitted through the upper ends of the socket members and serve to firmly secure them together in an obvious manner. Below the lever, a bolt 14 is inserted through the socket members and through a spacing sleeve 15 disposed between the said members so that the spaced relation of the members will be maintained and their tendency to bend under strain will be counteracted. A similar bolt 16 and spacer sleeve 17 is provided near the lower ends of the socket members and the lower extremities of said members are flared to extend through an opening in the bed plate and are provided below the opening with ears 18 encircling the fulcrum pin 7 so that the lever may rock upon said pin. The socket members, of course, pass at opposite sides of the piston rod 5 and, between the said members, a sleeve 19 is fitted upon the piston rod and is secured thereto by a pin 20 inserted diametrically through the sleeve and the rod, as clearly shown in Fig. 1. The said sleeve is provided on its sides with trunnions 21 which play in slightly elongated openings 22 in the lever whereby, when the lever is oscillated, a reciprocatory movement will be imparted to the piston rod without causing binding of the lever upon the rod or the fulcrum sleeve.

23 indicates one head of a pump cylinder 26 within which a reciprocatory plunger 30 is secured to the plunger rod 5.

The form of hand-operating mechanism herein shown and described is very efficient inasmuch as it is so mounted as to equalize the strain and thereby avoid bending or twisting of any of the parts and it will operate directly upon the piston rod. Furthermore, it may be very easily and quickly assembled with the bed plate and the piston rod.

Having thus described the invention, I claim:

1. In a reciprocating pump, the combination of a cylinder, a piston operating therein, a piston rod carrying said piston and extending through and beyond the end thereof, a guiding support for the outer end of the piston rod, a lever including side members disposed at the opposite sides of the piston rod and fulcrumed below the same, means above and below the piston rod to secure the side members together, a sleeve pinned to the piston rod between said side members, and trunnions on the sides of said sleeve engaged loosely in the said side members.

2. In a reciprocating pump, the combination of a cylinder, a piston operating therein, a piston rod carrying the piston and extending through and beyond an end of the cylinder, a guiding support for the outer free end of the piston rod, a bed plate supporting said guide and the cylinder, bosses on the under side of the bed plate, a lever comprising side members arranged at opposite sides of the piston rod and having their lower ends extending through the bed plate and provided with ears axially alined with the bosses on the bed plate, a fulcrum pin fitted through said bosses and said ears, a sleeve pinned to the piston rod between said side members, trunnions on said sleeve engaged in the said side members, spacer sleeves disposed between said side members above and below the piston rod, and fastening devices inserted through the spacer sleeves and the said side members.

In testimony whereof I affix my signature.

GEORGE J. WELTER. [L. S.]